(12) United States Patent
Jiang et al.

(10) Patent No.: US 9,391,838 B2
(45) Date of Patent: Jul. 12, 2016

(54) METHOD AND APPARATUS FOR SETTING NETWORK NODE LOCATION

(71) Applicant: Huawei Technologies Co., Ltd., Shenzhen (CN)

(72) Inventors: Yanping Jiang, Beijing (CN); Yongjun Liu, Beijing (CN); Mu Zhao, Beijing (CN)

(73) Assignee: Huaewei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 14/260,450

(22) Filed: Apr. 24, 2014

(65) Prior Publication Data

US 2014/0233401 A1 Aug. 21, 2014

Related U.S. Application Data

(63) Continuation of application No. PCT/CN2012/083655, filed on Oct. 29, 2012.

(30) Foreign Application Priority Data

Oct. 27, 2011 (CN) .......................... 2011 1 0332022

(51) Int. Cl.
*H04L 12/26* (2006.01)
*H04L 12/24* (2006.01)
*H04W 64/00* (2009.01)
*H04L 29/08* (2006.01)
(Continued)

(52) U.S. Cl.
CPC ............ *H04L 41/0816* (2013.01); *H04L 67/10* (2013.01); *H04W 24/02* (2013.01); *H04W 64/00* (2013.01); *H04W 84/18* (2013.01)

(58) Field of Classification Search
None
See application file for complete search history.

(56) References Cited

U.S. PATENT DOCUMENTS

| 5,613,217 | A | 3/1997 | Hagstroem et al. |
| 5,802,473 | A | 9/1998 | Rutledge et al. |
| 2005/0281207 | A1 | 12/2005 | Lee et al. |

(Continued)

FOREIGN PATENT DOCUMENTS

| CN | 1171487 A | 1/1998 |
| CN | 1684469 A | 10/2005 |

(Continued)

OTHER PUBLICATIONS

Partial English Translation and Abstract of Chinese Patent Application No. CN101715232A, Jun. 20, 2014, 4 pages.

(Continued)

*Primary Examiner* — Michael J Moore, Jr.
(74) *Attorney, Agent, or Firm* — Conley Rose, P.C.; Grant Rodolph

(57) ABSTRACT

A method and an apparatus for setting a network node location. The method is applied in a router in a ZigBee network and includes acquiring, by the router, a network parameter of at least one network device in a network connecting to the router; calculating the number of network parameters meeting a predefined threshold condition; mapping the number of the network parameters meeting the predefined threshold condition to corresponding indication information, wherein the indication information indicates deployment performance of the router in the network; and providing the indication information for a user, wherein the indication information is used to instruct the user to set a location for the router in the network.

20 Claims, 6 Drawing Sheets

(51) Int. Cl.
*H04W 24/02* (2009.01)
*H04W 84/18* (2009.01)

(56) References Cited

U.S. PATENT DOCUMENTS

| | | | |
|---|---|---|---|
| 2006/0019679 A1* | 1/2006 | Rappaport | H04W 64/00 455/456.5 |
| 2006/0094408 A1 | 5/2006 | Hu et al. | |
| 2006/0176834 A1* | 8/2006 | Dickerson | G08B 13/19656 370/260 |
| 2009/0081952 A1 | 3/2009 | Lee et al. | |
| 2009/0094349 A1 | 4/2009 | Smith | |
| 2012/0008514 A1* | 1/2012 | Ponnuswamy | H04W 24/06 370/252 |
| 2014/0087752 A1* | 3/2014 | Zhu | H04W 24/00 455/456.1 |
| 2014/0302869 A1* | 10/2014 | Rosenbaum | H04W 4/026 455/456.1 |

FOREIGN PATENT DOCUMENTS

| | | |
|---|---|---|
| CN | 101646177 A | 2/2010 |
| CN | 101715232 A | 5/2010 |
| CN | 101801012 A | 8/2010 |
| CN | 102196560 A | 9/2011 |
| KR | 100875903 B1 | 12/2008 |
| KR | 20090011912 A | 2/2009 |

OTHER PUBLICATIONS

Foreign Communication From a Counterpart Application, PCT Application No. PCT/CN2012/083655, English Translation of International Search Report dated Jan. 31, 2013, 2 pages.
Foreign Communication From a Counterpart Application, PCT Application No. PCT/CN2012/083655, English Translation of Written Opinion dated Jan. 31, 2013, 7 pages.
Partial English Translation and Abstract of Chinese Patent Application No. CN101646177A, Dec. 12, 2014, 33 pages.
Foreign Communication From a Counterpart Application, Chinese Application No. 201110332022.4, Chinese Office Action dated Nov. 15, 2014, 6 pages.
Foreign Communication From a Counterpart Application, Chinese Application No. 201110332022.4, Chinese Search Report dated Nov. 4, 2014, 2 pages.
Partial English Translation and Abstract of Korean Patent Application No. KR20090011912A, Part 1, May 21, 2015, 4 pages.
Partial English Translation and Abstract of Korean Patent Application No. KR20090011912A, Part 2, May 21, 2015, 3 pages.
Foreign Communication From a Counterpart Application, European Application No. 12843532.8, Extended European Search Report dated May 6, 2015, 7 pages.

* cited by examiner

METHOD AND APPARATUS FOR SETTING NETWORK NODE LOCATION

CROSS-REFERENCE TO RELATED APPLICATIONS

This application is a continuation of International Application No. PCT/CN2012/083655, filed on Oct. 29, 2012, which claims priority to Chinese Patent Application No. 201110332022.4, filed on Oct. 27, 2011, both of which are hereby incorporated by reference in their entireties.

TECHNICAL FIELD

The present invention relates to the field of radio communication, and in particular, to a method and an apparatus for setting a network node location.

BACKGROUND

The ZigBee technology features low complexity, low power consumption, and a low cost, and is widely applied in various fields, for example, smart energy management (ZigBee smart energy), home automation (ZigBee home automation), building automation (ZigBee building automation), remote control (ZigBee remote control), and the like.

A ZigBee network includes three types of nodes: a coordinator, a router, and an end device. The coordinator is a network establishment node and, like the router, has a data forwarding function. In the following, both the coordinator and the router are called the router and are no longer distinguished. The end device does not have the data forwarding function and can only forward data through the router. The end device is connected to a network through the router and the connected router is called a "parent node" of the end device. From the view of a network layer, the router mainly implements a network extension function, that is, the router functioning as the parent node allows access of more devices to the network, thereby enlarging a coverage range. A mesh network may be established between routers. In a ZigBee network, generally a large number of devices need to be deployed. To ensure network connectivity and robustness, the devices generally need to be deployed by professional personnel under an existing condition. Generally, performance of the router in a certain location can be determined only through extensive analysis by the professional personnel.

Therefore, in the prior art, the ZigBee router is not easy to deploy and deployment personnel need to have a professional knowledge background and an analysis tool and perform extensive analysis; otherwise, only whether the router is connected to the network can be displayed and it is impossible to place the router in a relatively good location.

SUMMARY

Embodiments of the present invention aim to provide a method and an apparatus for setting a network node location so as to facilitate deployment of a ZigBee router.

According to an embodiment of the present invention, a method for setting a network node location is provided and applied in a router in a ZigBee network. The method includes: acquiring, by the router, a network parameter of at least one network device in a network connecting to the router, where the network parameter is used to indicate connection performance of a link between the network devices; calculating the number of network parameters meeting a predefined threshold condition; mapping the number of the network parameters meeting the predefined threshold condition to corresponding indication information, where the indication information indicates deployment performance of the router in the network; and providing the indication information for a user, where the indication information is used to instruct the user to set a location for the router in the network.

According to another embodiment of the present invention, a router in a ZigBee network is provided and includes: a network parameter acquiring unit configured to acquire a network parameter of at least one network device in a network connecting to the router, where the network parameter is used to indicate connection performance of a link between the network devices; a calculating unit configured to calculate the number of network parameters meeting a predefined threshold condition; an indication information acquiring unit configured to map the number of the network parameters meeting the predefined threshold condition to corresponding indication information, where the indication information indicates deployment performance of the router in the network; and a displaying unit configured to provide the indication information for a user, where the indication information is used to instruct the user to set a location for the router in the network.

In the embodiments of the present invention, the network parameter of the network in which the ZigBee router is located is used, the connectivity or robustness of the ZigBee network is considered, the deployment performance of the ZigBee router in the network is acquired, and the deployment performance is provided for users. The users may easily know an advantage and a disadvantage of the current deployment location and may deploy the ZigBee network by themselves according to the indication information, which requires no ZigBee-related professional knowledge background and is simple and practicable.

DESCRIPTION OF EMBODIMENTS

A ZigBee router only displays whether it is connected to a network and it is impossible to learn a working status and a connection status of a current specific router. When deploying a router by themselves, due to lack of professional background knowledge, users cannot determine a location of the router for relatively good communication quality by themselves by using an existing ZigBee router device and has difficulty in finding a relatively good deployment location. In addition, due to an indoor environment change (for example, adding furniture, changing the location of the furniture, changing the location of a device, and the like), a signal coverage hole may occur in the network that has been built. It is also difficult for the users to adjust the location of the device and ensure deployment quality of the network by themselves.

To resolve this problem, the router in the present invention calculates a network parameter of a current location according to network information after joining the network, determines an advantage and a disadvantage of a current deployment location by using the network parameter as an input, and indicates a determination result. The determination result is simple and easy to understand, allowing users without professional background knowledge to perform deployment.

The network parameter and determination method have multiple implementation manners, which are described in detail in the following embodiments.

The determination result may be simple yes/no. For example, if an indicator is red, it indicates that the current location is not acceptable; if the indicator is green, it indicates that the location is acceptable. The determination result may be further broken down. For example, a full score (5 score) indicates a best location, a lower score indicates a worse location, and a 0 score indicates that the current location is unavailable. The users may make several attempts and determine a good deployment location through comparison.

The foregoing method may ensure connectivity and robustness of a deployed ZigBee network. According to indication information of a routing device, the users may easily know the advantage and disadvantage of the current deployment location and can deploy the ZigBee network by themselves, which requires no ZigBee-related professional knowledge background and is simple and practicable.

Figure 1:
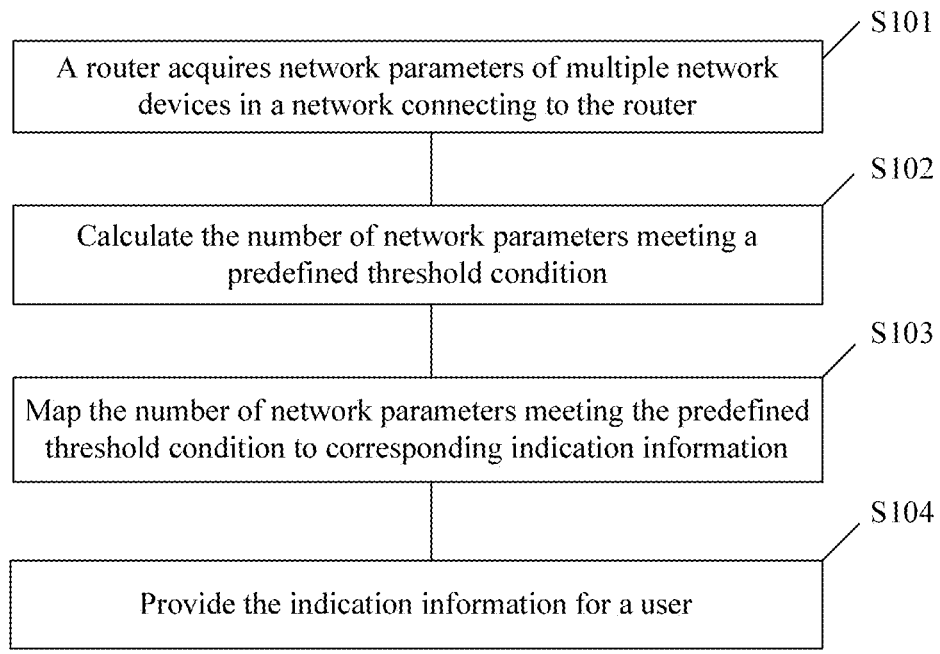
FIG. 1 is a schematic flowchart of a method for setting a network node location provided in an embodiment of the present invention.

Referring to FIG. 1, a method for setting a network node location according to an embodiment of the present invention is applied in a router in a ZigBee network. The method includes:

S101: The router acquires a network parameter of at least one network device in a network connecting to the router.

The network parameter is used to indicate connection performance of a link formed between the network devices in the network and may include a receive signal strength indicator (RSSI), a link quality indicator (LQI), a packet loss rate, a communication delay, or a link cost of a neighboring node. Certainly, a person skilled in the art may know that any other parameter that can represent the connection performance of the link in the network may also be used as the network parameter.

S102: Calculate the number of network parameters meeting a predefined threshold condition.

The number of the network parameters meeting the predefined threshold condition indicates the number of links meeting a communication condition in the network. Corresponding to different network parameters, meeting the predefined threshold condition means that a network parameter value may be greater than or equal to a predefined threshold or may be less than or equal to the predefined threshold. For the RSSI and LQI, the predefined threshold condition means that the network parameter value of RSSI or LQI is greater than or equal to a set threshold. For the packet loss rate, the communication delay, and the link cost of the neighboring node, the predefined threshold condition means that the network parameter value of the packet loss rate, the communication delay, or the link cost of the neighboring node is less than or equal to the set threshold. The thresholds corresponding to different network parameters may be set as required and are used to define the connection performance meeting the communication condition for the link.

S103: Map the number of the network parameters meeting the predefined threshold condition to corresponding indication information, where the indication information indicates deployment performance of the router in the network.

Map the number of the network parameters meeting the predefined threshold condition to one of at least two corresponding values according to the number. The at least two values correspond to different levels of the deployment performance of the router in the network respectively. The different levels may be in descending order or in ascending order, that is, a larger value may indicate better deployment performance or a larger value may indicate worse deployment performance as long as such a rule is clearly stated to a user and can be used by the user. Certainly, the level of a location that is proper for the user to deploy the router may also be recommended to the user.

In an embodiment, if the number of the network parameters meeting the predefined threshold condition is larger than or equal to a first threshold, location deployment indication information of the router is first indication information; otherwise, the location deployment indication information of the router is second indication information. The first indication information has a higher deployment performance level than the second indication information. The first threshold may be set according to an empirical value and network performance or may be determined according to the number of devices in the network. The first indication information indicates that performance of the router meets a requirement when the router is deployed in a location. The second indication information indicates that the performance of the router does not meet the requirement when the router is deployed in the location. For example, when the first indication information is 1, it indicates that a deployment location of the router in the network is good. When the second indication information is 0, it indicates that the deployment location of the router in the network is not good. Alternatively, when the number of the network parameters meeting the predefined threshold condition is smaller than or equal to the first threshold, the location deployment indication information of the router may also be mapped to the first indication information; otherwise, the location deployment indication information of the router is mapped to the second indication information. The first indication information is used to indicate that the location of the router in the network is not good and the second indication information is used to indicate that the location of the router in the network is good. For example, when the first indication information is 0, it indicates that the deployment location of the router in the network is not good. When the second indication information is 1, it indicates that the deployment location of the router in the network is good.

In another embodiment, if the number of the network parameters meeting the predefined threshold condition is larger than or equal to a first threshold and smaller than or equal to a second threshold, the location deployment indication information of the router is the first indication information; otherwise, the location deployment indication information is the second indication information. The first indication information has a higher deployment performance level than the second indication information. The first threshold and the second threshold may be set according to an empirical value and network performance or may be determined according to the number of devices in the network. The first indication information is used to indicate that performance of the router meets a requirement when the router is deployed in a location. The second indication information is used to indicate that the performance of the router does not meet the requirement when the router is deployed in the location. For example, when the first indication information is 1, it indicates that the router may be deployed in the location. When the second indication information is 0, it indicates that the router cannot be deployed in the location.

In another embodiment, the indication information includes N values. The number of the network parameters meeting the predefined threshold condition is mapped to one of the corresponding N values, where N is an integer greater than or equal to 3. A larger number of the network parameters meeting the predefined threshold condition indicates a larger value. For example, the number of the network parameters meeting the predefined threshold condition is mapped to an integer value (for example, ranging from 0 to 5). A larger value indicates a better location. For example, a full score (5 score) indicates a best location, a lower score indicates a worse location, and a 0 score indicates that the current location is unavailable. In this case, it may be defined that the user may deploy the router in the location when the value of the indication information exceeds a certain value.

S104: Provide the indication information for the user, where the indication information is used to instruct the user to set the location for the router in the network.

The indication information may be provided in multiple manners: displaying the indication information; or providing the indication information for the user in an auditory manner; or providing the indication information in a tactile manner.

Providing the indication information in a displaying manner: in a manner, a light emitting diode (LED) may be used for displaying. If the current location is relatively good, the LED is on; otherwise, the LED is off. In another manner, at least one LED may be used. The number of LEDs that are on varies with a status of the location. A better location indicates a larger number of LEDs that are on, and vice versa. In another manner, LED colors may be used to differentiate different indication information. For example, a red color indicates that the location is not good, a yellow color indicates that the location is common, and a green color indicates that the location is relatively good. In another manner, the indication information may be displayed by using a display screen or a seven-segment digital tube or a digit. For example, a larger digit indicates a better location. In addition to the displaying manner, the indication information may also be provided for the user in the auditory manner. In a manner, the indication information may be prompted by using a voice, providing convenience for a visually impaired user. In another manner, the indication information may be intuitively provided by using a sound volume of a beep. For example, a larger sound indicates a better location, and vice versa. In another implementation manner, the indication information may be provided in the tactile manner. The indication information may be intuitively provided according to how strong a vibration is. For example, a stronger device vibration indicates a better location, and vice versa.

The user may deploy the router according to the indication information. For example, if the indication information indicates that the location is relatively good, the router may be deployed in the location; if the indication information indicates that the location is not good, another location may be used for deployment.

In the foregoing embodiment, the network parameter of the network in which the ZigBee router is located is used, the connectivity or robustness of the ZigBee network is considered, the deployment performance of the ZigBee router in the network is acquired, and the deployment performance is provided for users. The users may easily know an advantage and a disadvantage of the current deployment location and may deploy the ZigBee network by themselves according to the indication information, which requires no ZigBee-related professional knowledge background and is simple and practicable.

In the foregoing embodiment, step S102 for calculating the number of the network parameters meeting the predefined threshold condition may have different embodiments that correspond to different network parameters respectively, which is described in detail in the following embodiments.

Figure 2:
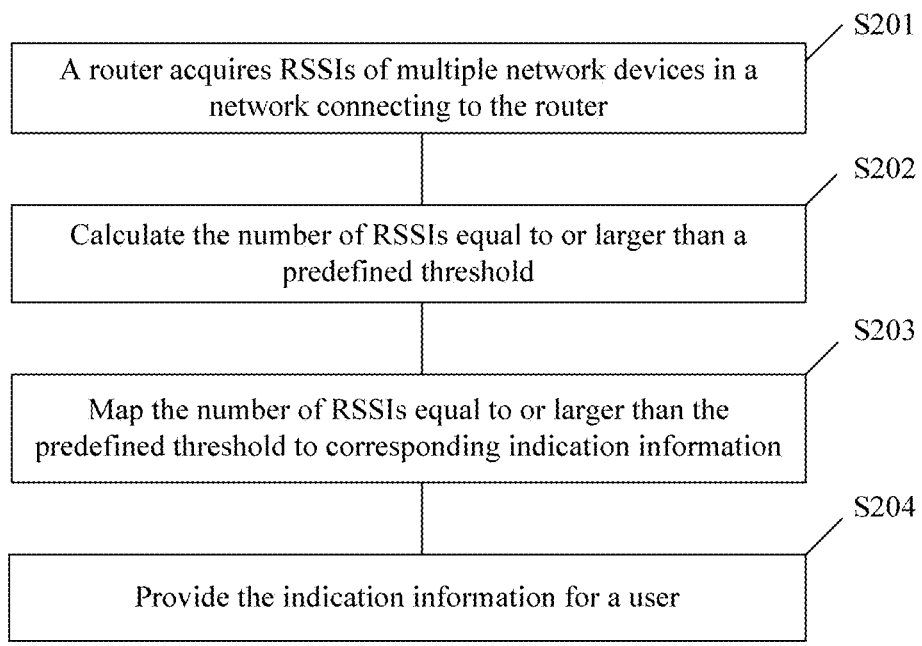
FIG. 2 is a schematic flowchart of a method for setting a network node location provided in another embodiment of the present invention.

Referring to FIG. 2, a method for setting a network node location according to another embodiment of the present invention is applied in a router in a ZigBee network. The method includes:

S201: The router acquires an RSSI of at least one network device in a network connecting to the router.

Figure 3:
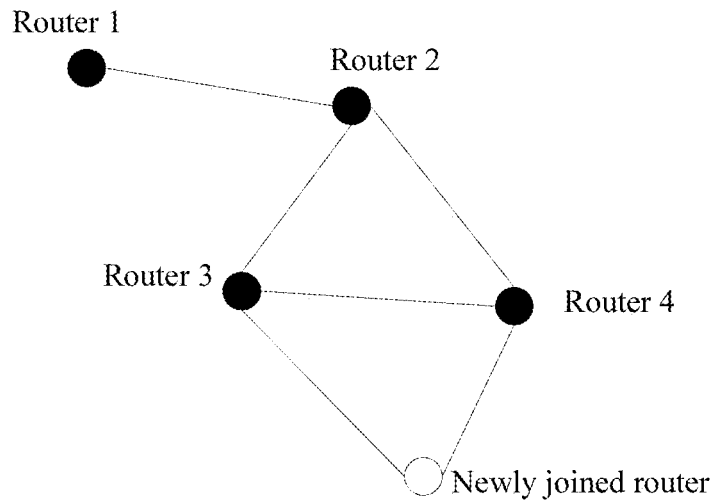
FIG. 3 is a schematic structural diagram of a network in which a router is located according to an embodiment of the present invention.

The RSSI is a receive signal strength indicator and a unit is generally decibel milliwatts (dBm). After a ZigBee router joins the network, that is, during deployment or during normal operation, the RSSI (receive signal strength indicator, receive signal strength) information that the router may receive from any other device (may include the router or an end device) in a current deployment location is collected. As shown in FIG. 3, the router newly joining the network may receive the RSSI information from routers 3 and 4. The RSSI is acquired in the following manner: the router may acquire the corresponding RSSI information by using a bottom-layer drive when unpacking a received data packet. The RSSI may be an average value within a period of time or an average value of several data packets. In addition, the RSSI is updated as an actual channel status changes.

To acquire the RSSI information of a nearby device, the router may extract the RSSI information from data packets received by the router. These data packets may be sent to the router or may be sent to any other device. The router may perform monitoring in promiscuous mode to monitor all the data packets no matter whether these data packets are sent to the router. If a non-promiscuous mode is used, the router can monitor only a data packet that is sent to the router.

S202: Calculate the number of RSSIs larger than or equal to a predefined threshold.

The received RSSI values with a set threshold RSSI_threshold and it is found that A RSSIs meet RSSI≥RSSI_threshold through calculation.

S203: Map the number of RSSIs larger than or equal to the predefined threshold to corresponding indication information, where the indication information indicates deployment performance of the router in the network.

Map the number of RSSIs larger than or equal to the predefined threshold to one of at least two corresponding values according to the number. The at least two values correspond to different levels of the deployment performance of the router in the network respectively. The different levels may be in descending order or in ascending order, that is, a larger value may indicate better deployment performance or a larger value may indicate worse deployment performance as long as such a rule is clearly stated to a user and can be used by the user. Certainly, the level of a location that is proper for the user to deploy the router may also be recommended to the user.

In an implementation manner, if A meets a condition of $A \geq X1$, it indicates that the current deployment location is acceptable; otherwise, it indicates that the deployment location is unacceptable. A first threshold $X1$ may be acquired according to network deployment experience and may be used as a router configuration parameter.

In another implementation manner, to prevent unnecessary resource waste due to too dense deployment, an upper limit value of A may be further limited, that is, the deployment location is acceptable when A meets a condition of $X1 \leq A \leq Y1$ and the deployment location is unacceptable when A does not meet a condition of $X1 \leq A \leq Y1$. A value of a first threshold $X1$ and a value of a second threshold $Y1$ may be acquired according to network deployment experience and may be used as a router configuration parameter each.

In another implementation manner, A is mapped to an integer value (for example, ranging from 0 to 5). A larger value indicates a better location.

S204: Provide the indication information for the user, where the indication information is used to instruct the user to set the location for the router in the network.

The indication information may be provided in multiple manners, for example, the indication information may be provided in a displaying manner, in an auditory manner, or in a tactile manner.

In the foregoing embodiment, the deployment performance of the ZigBee router in the network is acquired according to the RSSI, the robustness of the network is considered, and the deployment performance is provided for users. The users may easily know an advantage and a disadvantage of the current deployment location and can deploy the ZigBee network by themselves, which is simple and practicable.

Figure 4:
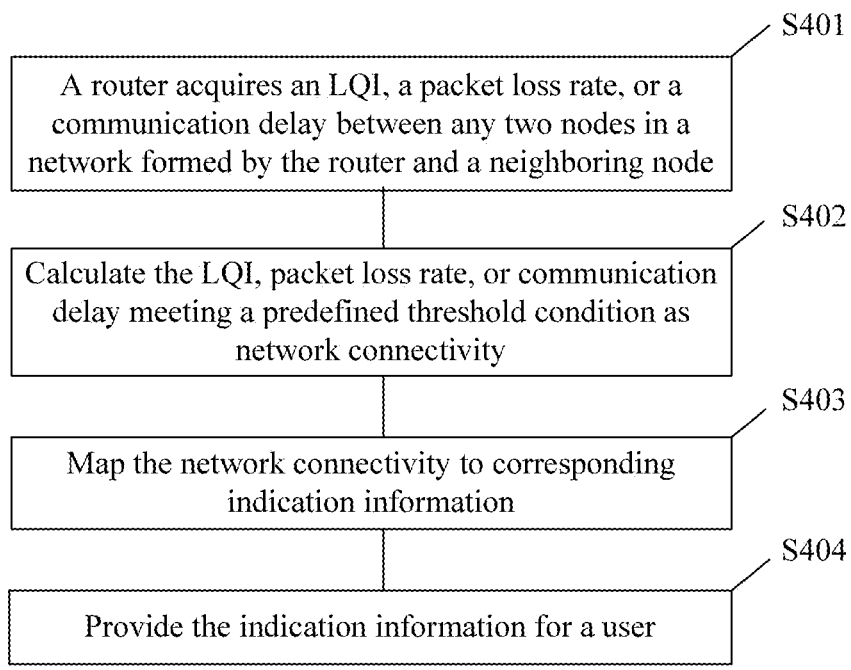
FIG. 4 is a schematic flowchart of a method for setting a network node location provided in another embodiment of the present invention.

Referring to FIG. 4, a method for setting a network node location according to another embodiment of the present invention is applied in a router in a ZigBee network. The method includes:

S401: The router acquires an LQI, a packet loss rate, or a communication delay between any two nodes in a network formed by the router and a neighboring node.

The network formed by the router and the neighboring node may be a network formed with a one-hop neighboring node, a network formed with a two-hop neighboring node, or a network formed with a three-hop neighboring node.

The router may acquire the LQI, the packet loss rate, or the communication delay between any two nodes in the network formed by the router and its neighboring node. Alternatively, the router may also acquire the LQI, the packet loss rate, or the communication delay between any two nodes in the network formed by the neighboring node of the router and a neighboring node of the neighboring node; and may also acquire the LQI, the packet loss rate, or the communication delay between any two nodes in the network formed by the neighboring node of the router, the neighboring node of the neighboring node (the two-hop neighboring node) and the three-hop neighboring node.

The router may acquire the LQI, the packet loss rate, or the communication delay of a connection between the router and any one of its neighboring nodes and the LQI, the packet loss rate, or the communication delay of the connection between all neighboring nodes and their own neighboring nodes.

The LQI indicates quality of a link between a device and another device. The LQI may be calculated according to the RSSI or in any other implementation manner such as a signal-related method. The packet loss rate may be acquired by means of acknowledgement (ACK) statistics. The communication delay may be a backhaul delay, that is, a time length from sending of a data packet to reception of a data packet returned by a peer end. The LQI, packet loss rate, and communication delay may be an average value within a period of time or an average value of several data packets, and are updated as an actual channel status changes.

S402: Calculate the number of LQIs, packet loss rates, or communication delays meeting a predefined threshold condition as network connectivity.

Figure 5:
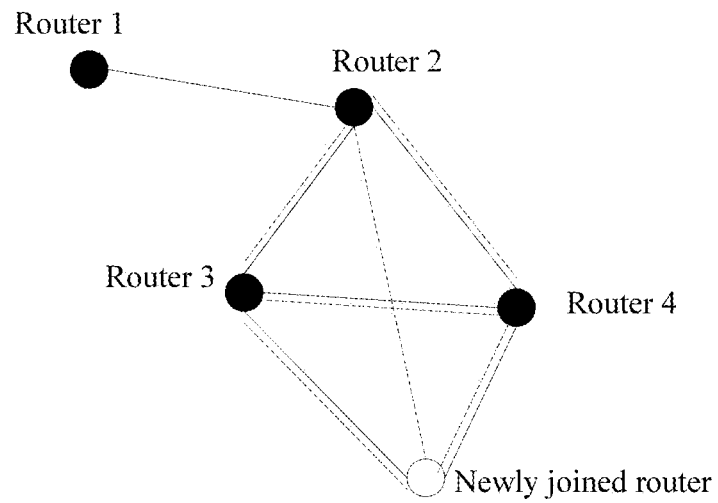
FIG. 5 is a schematic structural diagram of a network in which a router is located according to an embodiment of the present invention.

After the router joins the network, the connectivity of the network formed by the neighboring node of the router and the neighboring node of the neighboring node is calculated. As shown in FIG. 5, the router newly joining the network, its neighboring node routers 3 and 4, and a neighboring node router 2 of routers 3 and 4 form a network. Statistics on the connectivity of the network are collected, and it is assumed that a connectivity value of the network is B.

The network connectivity is calculated according to the LQI, the packet loss rate, or the communication delay, that is, the number of LQIs, packet loss rates, or communication delays meeting the predefined threshold condition is calculated as the network connectivity.

There are three methods for calculating the network connectivity:

Method 1: Acquire the LQI between any two nodes in the network formed by the neighboring node of the router and the neighboring node of the neighboring node.

Collect statistics on the number of LQIs larger than or equal to a set threshold as the network connectivity.

If the LQI between two nodes is larger than a certain threshold, the network connectivity increases by 1.

Method 2: Acquire the packet loss rate between any two nodes in the network formed by the neighboring node of the router and the neighboring node of the neighboring node.

Collect statistics on the number of packet loss rates smaller than or equal to the set threshold as the network connectivity.

If an average packet loss rate between two nodes is smaller than or equal to a certain threshold, the network connectivity increases by 1.

Method 3: Acquire the communication delay between any two nodes in the network formed by the neighboring node of the router and the neighboring node of the neighboring node.

Collect statistics on the number of communication delays smaller than or equal to the set threshold as the network connectivity.

If the communication delay between two nodes is smaller than or equal to a certain threshold, the network connectivity increases by 1.

S403: Map the network connectivity to corresponding indication information, where the indication information indicates deployment performance of the router in the network.

Map the network connectivity to one of at least two corresponding values according to the number. The at least two values correspond to different levels of the deployment performance of the router in the network respectively. The different levels may be in descending order or in ascending order, that is, a larger value may indicate better deployment performance or a larger value may indicate worse deployment performance as long as such a rule is clearly stated to a user and can be used by the user. Certainly, the level of a location that is proper for the user to deploy the router may also be recommended to the user.

In an implementation manner, if the network connectivity B meets a condition of B≥X2, it indicates that a current deployment location is acceptable; otherwise, it indicates that a deployment location is unacceptable. A first threshold X2 may be set according to a network deployment empirical value and may be used as a router configuration parameter.

In another implementation manner, to prevent unnecessary resource waste due to too dense deployment, an upper limit value of B may be further limited, that is, the current deployment location is acceptable when B meets a condition of X2≤B≤Y2 and the deployment location is unacceptable when B does not meet a condition of X2≤B≤Y2. A first threshold X2 and a second threshold Y2 may be set according to a network deployment empirical value and may be used as a router configuration parameter each.

In another implementation manner, B is mapped to an integer value (for example, ranging from 0 to 5). A larger value indicates a better location.

S404: Provide the indication information for the user, where the indication information is used to instruct the user to set the location for the router in the network.

The indication information may be provided in multiple manners, for example, the indication information may be provided in a displaying manner, in an auditory manner, or in a tactile manner.

In the foregoing embodiment, the deployment performance of the ZigBee router in the network is acquired according to the LQI, the packet loss rate, or the communication delay between devices in the network, robustness of the network is considered, and the deployment performance is provided for users. The users may easily know an advantage and a disadvantage of the current deployment location and can deploy the ZigBee network by themselves, which is simple and practicable.

Figure 6:
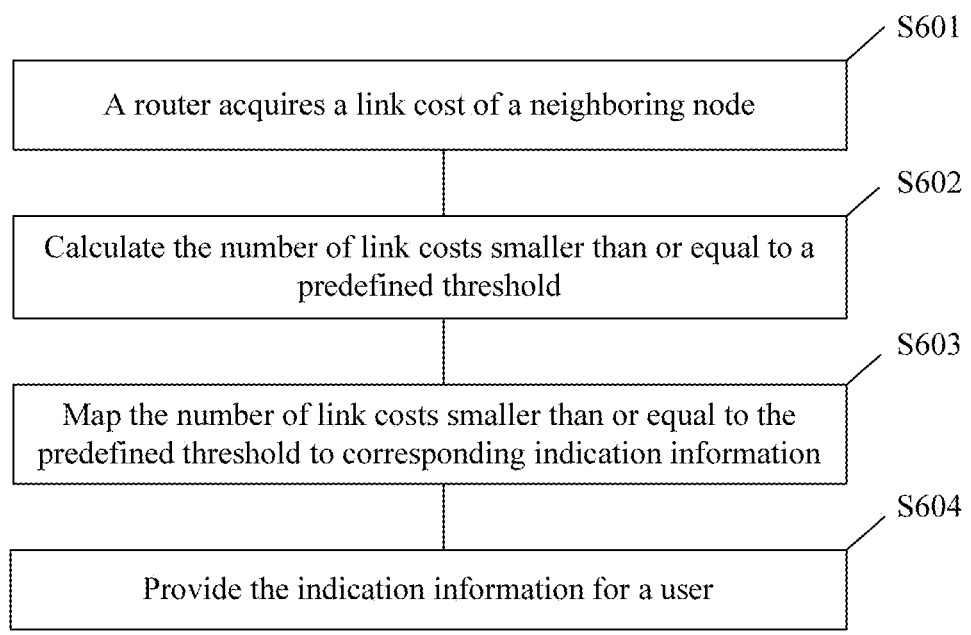
FIG. 6 is a schematic flowchart of a method for setting a network node location provided in another embodiment of the present invention.

Referring to FIG. 6, a method for setting a network node location according to another embodiment of the present invention is applied in a router in a ZigBee network. The method includes:

S601: The router acquires a link cost of a neighboring node.

In the network, the router may periodically broadcast a link status command. The command carries a neighboring node list of a device sending the command and the link cost corresponding to each node. The link cost may include a sending cost and a receiving cost. The sending cost refers to a cost for a device to send a data packet to any other device, and the receiving cost refers to a cost for any other device to send a data packet to a local device.

Figure 7:
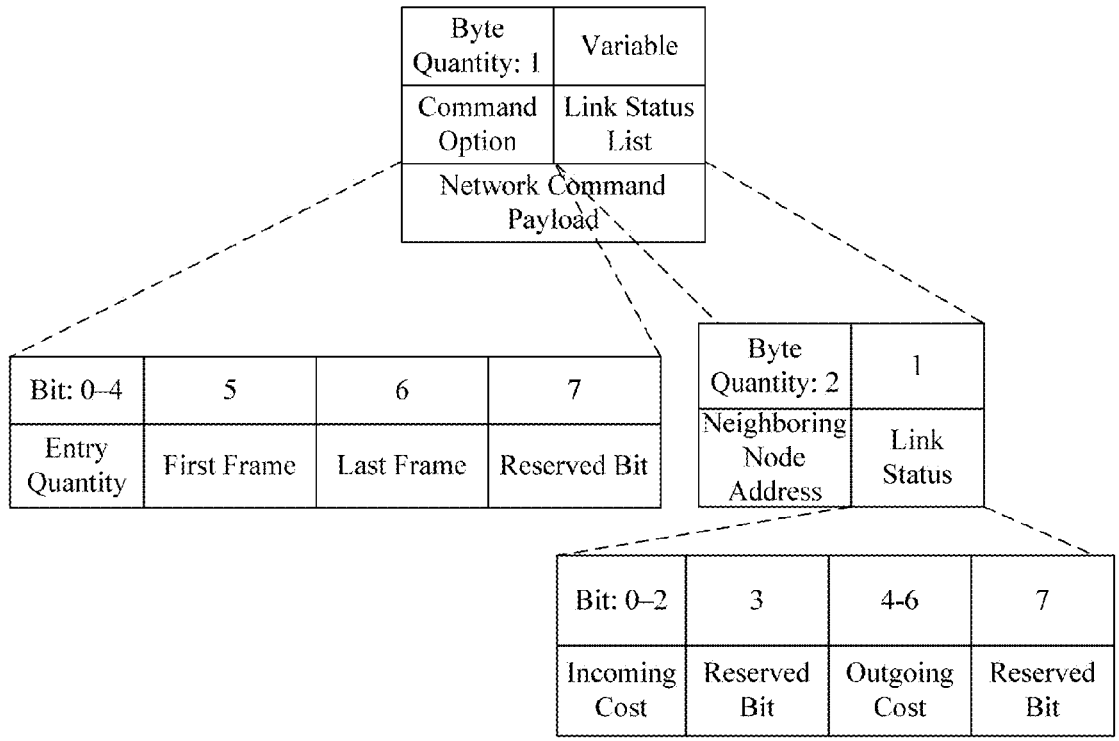
FIG. 7 is a schematic diagram of a link status command according to an embodiment of the present invention.

The link status command defined in ZigBee is illustrated in FIG. 7. A router device in the network periodically sends the command according to a set parameter. The command needs to carry link cost information of the neighboring node. In a case that there are a relatively large number of neighboring nodes, the command may not be included in one frame and may be sent in multiple frames. Therefore, "First Frame" and "Last Frame" in a "Command Option" domain may indicate whether to divide the link status command into several parts for sending. If the link status command is divided into several parts for sending, "First Frame" and "Last Frame" are used to mark whether the link status command is a first frame or a last frame. In addition, the number of link cost entries of the neighboring node carried in the command may be learned by using an "Entry Quantity" domain. Each link cost entry includes "Incoming Cost" and "Outgoing Cost". The incoming cost and the outgoing cost indicate the receiving cost and the sending cost respectively. The link status command is sent through single-hop broadcasting and therefore can be received only by the neighboring node. The device may learn information about its neighboring nodes by receiving the link status command and record the information to form a neighbor list.

The link cost may be represented by using an abstract digit, for example, 0-7. The link cost may be acquired according to methods such as link bandwidth, link load statistics, packet loss rate statistics, or the like. In addition, the link cost information may be periodically updated. When a channel status changes, the corresponding link cost information is updated accordingly. The device may check, after receiving the link status command of a neighboring device, whether the link status command carries its own cost information because the receiving cost of the neighboring device for the device is the sending cost from the device to the neighboring device. The device itself cannot learn a status of data packet sending and requires feedback from the neighboring device.

After joining the network, the router may acquire the neighboring node list and the link cost corresponding to each node by periodically sending and receiving the link status command. As shown in FIG. 3, the link cost of the router newly joining the network to its neighboring node routers 3 and 4 may be acquired.

S602: Calculate the number of link costs smaller than or equal to a predefined threshold.

Statistics on the number of neighboring nodes with the link costs smaller than a cost threshold are collected. The sending cost and receiving cost of each neighboring node is compared with the set cost threshold. There are C nodes whose sending cost and receiving cost are both smaller than or equal to the cost threshold.

S603: Map the number of the link costs smaller than or equal to the predefined threshold to corresponding indication information, where the indication information indicates deployment performance of the router in the network.

Map the number of the link costs smaller than or equal to the predefined threshold to one of at least two corresponding values according to the number. The at least two values correspond to different levels of the deployment performance of the router in the network respectively. The different levels may be in descending order or in ascending order, that is, a larger value may indicate better deployment performance or a larger value may indicate worse deployment performance as long as such a rule is clearly stated to a user and can be used by the user. Certainly, the level of a location that is proper for the user to deploy the router may also be recommended to the user.

In an implementation manner, if C meets a condition of C≥X3, a current location is considered acceptable; otherwise, it indicates that the current location is unacceptable. A first threshold X3 may be set according to a network deployment empirical value and may be used as a router configuration parameter.

In another implementation manner, to prevent unnecessary resource waste due to too dense deployment, an upper limit value of the C may be further limited, that is, the current location is acceptable when the C meets a condition of X3≤C≤Y3 and the current location is unacceptable when the C does not meet a condition of X3≤C≤Y3. A first threshold X3 and a second threshold Y3 may be set according to a network deployment empirical value and may be used as a router configuration parameter each.

In another implementation manner, C is mapped to an integer value (for example, ranging from 0 to 5). A larger value indicates a better location.

S604: Provide the indication information for the user, where the indication information is used to instruct the user to set the location for the router in the network.

The indication information may be provided in multiple manners, for example, the indication information may be provided in a displaying manner, in an auditory manner, or in a tactile manner.

In the foregoing embodiment, the deployment performance of the ZigBee router in the network is acquired according to the link cost of the neighboring node, robustness of the network is considered, and the deployment performance is provided for users. The users may easily know an advantage and a disadvantage of a current deployment location and can deploy the ZigBee network by themselves, which is simple and practicable.

Figure 8:
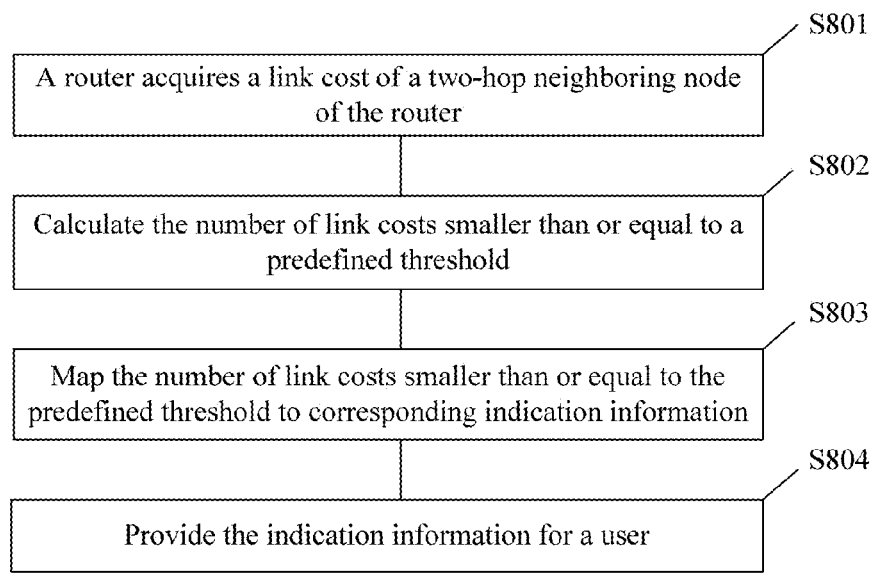
FIG. 8 is a schematic flowchart of a method for setting a network node location provided in another embodiment of the present invention.

Referring to FIG. 8, a method for setting a network node location according to another embodiment of the present invention is applied in a router in a ZigBee network. The method includes:

S801: The router acquires a link cost of a two-hop neighboring node of the router.

Figure 9:
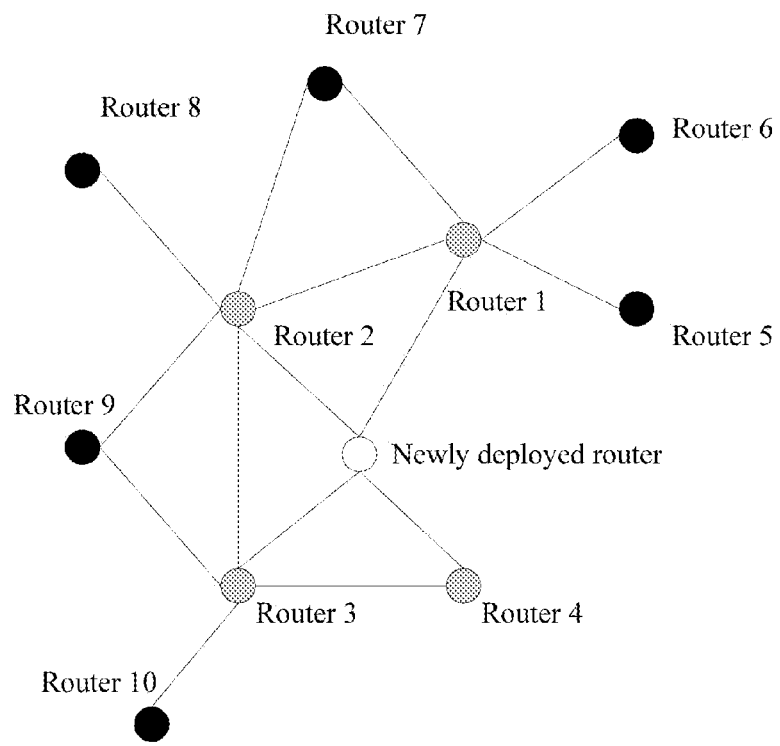
FIG. 9 is a schematic structural diagram of a network in which a router is located according to an embodiment of the present invention.

The two-hop neighboring node refers to a neighboring node of the neighboring node. The link cost includes a sending cost and a receiving cost. After joining the network, by receiving a link status command, the router not only may acquire link cost information of all its neighboring nodes but also may further acquire the link cost information of all two-hop neighboring nodes. In a part of the network shown in FIG. 9, the router newly joining the network can directly receive the link status command only from routers 1, 2, 3, and 4. Therefore, the four nodes are neighboring nodes of the router newly joining the network. However, the link status command sent by the router 2 contains information of routers 1, 3, 7, 8, and 9. In addition to neighboring node routers 1 and 3, the router newly joining the network may also learn that routers 7, 8, and 9 are its two-hop neighboring nodes and learn the link cost between the routers 7, 8, and 9 and the router 2. In the same way, the router newly joining the network may also know that routers 5, 6, and 10 are its two-hop neighboring nodes. In addition, the link cost information may be periodically updated. When a channel status changes, the corresponding link cost information is updated accordingly.

S802: Calculate the number of link costs smaller than or equal to a predefined threshold.

If both the sending cost and the receiving cost between two nodes are smaller than or equal to a certain threshold, for example, 3, a connection is considered a relatively good connection. Statistics on the number of relatively good connections between original nodes in a local area before the router joins are collected and an assumed value is D. Statistics on the number of relatively good connections newly added in the local area after the router joins are collected and an assumed value is E.

The number of key connections added by the router may also be collected and an assumed value is F. A key connection herein means that a relatively good connection is available between a neighboring node of the router and any other neighboring node or a two-hop neighboring node of the router due to joining of the router. For example, in FIG. 5, assuming that the connection between routers 3 and 4 is not good and any other connection is relatively good, the router newly joining the network adds the key connection, that is, the connection between the router newly joining the network and the router 4.

S803: Map the number of the link costs smaller than or equal to the predefined threshold to corresponding indication information, where the indication information indicates deployment performance of the router in the network.

Map the number of the link costs smaller than or equal to the predefined threshold to one of at least two corresponding values according to the number. The at least two values correspond to different levels of the deployment performance of the router in the network respectively. The different levels may be in descending order or in ascending order, that is, a larger value may indicate better deployment performance or a larger value may indicate worse deployment performance as long as such a rule is clearly stated to a user and can be used by the user. Certainly, the level of a location that is proper for the user to deploy the router may also be recommended to the user.

If E meets a condition of E≥X4, the location is considered relatively good. A first threshold X4 may be set according to a network deployment empirical value and may be used as a router configuration parameter.

Alternatively, if E/D meets a condition of E/D≥X5, the location is considered relatively good. A first threshold X5 may be set according to a network deployment empirical value and may be used as a router configuration parameter.

Alternatively, the E/D is mapped to a digit ranging from 0 to 5. A larger value indicates a better location.

Alternatively, if F meets a condition of F≥X6, the location is considered relatively good. A first threshold X6 may be set according to a network deployment empirical value and may be used as a router configuration parameter.

To prevent unnecessary resource waste due to too dense deployment, an upper limit value of the E, E/D, and F may be further limited, that is, the E, E/D, and F meet conditions of X4≤E≤Y4, X5≤E/D≤Y5, and X6≤F≤Y6 respectively. The first thresholds X4, X5, and X6 and second thresholds Y4, Y5, and Y6 may be set according to a network deployment empirical value and may be used as a router configuration parameter each.

S804: Provide the indication information for the user, where the indication information is used to instruct the user to set the location for the router in the network.

The indication information may be provided in multiple manners, for example, the indication information may be provided in a displaying manner, in an auditory manner, or in a tactile manner.

In the network, some devices, for example, an end device of the ZigBee network, may not send the link status command. However, as long as the router is directly connected to these devices, a status of the connection with each device may be learnt by performing an equivalent operation to acquire a link cost parameter according to a packet loss rate, communication link quality, and the like and then by using the foregoing method for calculation and determination.

In the foregoing embodiment, the deployment performance of the ZigBee router in the network is acquired according to the link cost of the two-hop neighboring node, robustness of the network is considered, and the deployment performance is provided for users. The users may easily know an advantage and a disadvantage of a current deployment location and can deploy the ZigBee network by themselves, which is simple and practicable.

The first threshold or the second threshold may be selected according to a network status. In the foregoing embodiments, criterion design mainly aims to improve network robustness by deploying a router and avoid too dense deployment. By deploying a router, a user may have other demands in addition to improving the network robustness. An important demand is to increase a network coverage range, that is, network connectivity, and eliminate a coverage hole, while there is no high requirement on the robustness. In this case, the first threshold or the second threshold may be selected differently. For example, in Embodiment 1, if the A meets a condition of M1≤A≤N1, it is considered that the current deployment location may meet a connectivity requirement. In this case, a second threshold N1 may be a first threshold X1 in the case of robustness. The first threshold may ensure minimum acceptable connectivity. The processing in other three embodiments is similar: Mi≤judgment parameter≤Ni, i=1, 2, 3, 4, 5, 6. Each threshold is acquired according to network deployment experience and may be used as a router configuration parameter.

In another embodiment, the first threshold or the second threshold may be determined according to the number of devices in the network. In the network, some devices playing a central management role may learn the number of devices in the entire network. For example, a trust center in the ZigBee network is informed when each device joins or exits the network. Therefore, the trust center may learn the number of devices in the entire network. The router may send a device quantity request command to a central management device to acquire the number of devices in the entire network for determining the advantage and disadvantage of the deployment. The router may periodically send the device quantity request command and may acquire real-time device quantity information when the number of devices in the network changes. In the network, the total number of devices is very important for accurate selection of a second threshold Yi. For example, in Embodiment 1, there are a total of four devices in the network. If the router newly joining the network receives four values larger than or equal to RSSI_threshold, it indicates that the deployment is too dense. In this case, restricting Y1 according to the number of devices may easily avoid too dense deployment.

Acquiring, by the router, the network parameter of at least one network device in the network connecting to the router includes: acquiring the network parameter of at least one network device in a regional network connecting to the router; or acquiring the network parameter of at least one network device in the network formed by the device bound to the router.

The router may use the network parameter of the at least one network device in the network connecting to the router or establish binding with one or at least one device in the network to acquire the network parameter of the at least one network device in the bound network. The status of the connection between the router and the bound device is considered and a connection relationship with any other unbound device is not considered. The methods in the foregoing embodiments may be used to determine the advantage and the disadvantage of the deployment location.

Certainly, the foregoing two methods may be used in a combined manner.

Figure 10:
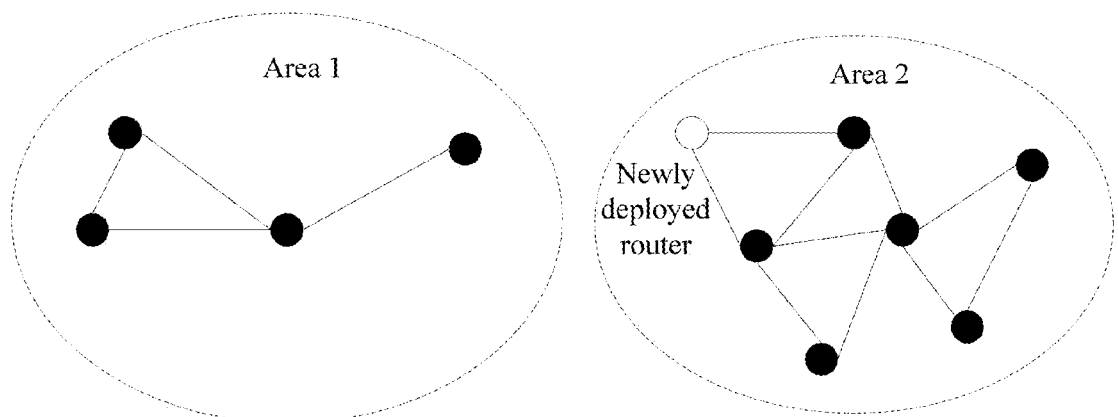
FIG. 10 is a schematic structural diagram of a network in which a router is located according to an embodiment of the present invention.

Router deployment may also aim to enhance reliability or coverage of a specific device or area. As shown in FIG. 10, for example, it is now expected to enhance coverage of an area 1. When a router is deployed in an area 2, it may also be indicated that the location is relatively good but an expected effect is not achieved. Certainly, users may determine the area in which the router is actually deployed according to their own experience. However, an area difference is sometimes not particularly obvious.

To resolve the foregoing problem, binding the specific device is introduced to determine the advantage and disadvantage of the deployment location. Specifically, the router first establishes the binding with one, or at least one, device in the area 1. Such a binding relationship, certainly, may be written into the router by using a configuration tool, that is, the configuration tool sends a router deployment binding command to the router to be instructed and the command contains an address of the device to be bound, or by using an input module on the router. However, a method that the user may use more easily is that an input module like a button may be available on the router and a relevant device. After the router button is pressed, the router sets a waiting duration such as 10 seconds (s). Then the button of the device to be bound to the router is pressed and the device sends a router deployment binding response command to the router, where the response command carries a network address or the Institute of Electrical and Electronics Engineers (IEEE) address of the device. After receiving the response command, the router records a binding item. The binding is completed. In this process, the router and the relevant device may provide the user with some indication indicating a relevant operation. For example, after the router button is pressed, an indicator on the router blinks periodically, a rhythmic beep is generated, regular vibration is undergoing, or the like, which indicates waiting for the response command. After a user presses the button of the device to be bound, the device may also prompt the user by using indicator blinking, beeping, vibration and the like. After the router receives the response command, the similar method may also be used to provide the indication. In addition, the router may also actively send a router deployment binding request command. Only the device receiving the request command can send the response command.

The router may also perform deployment binding with at least one device, that is, during binding initiated by the router, at least one device may send the router deployment binding response command to the router and the router records the binding with the at least one device; or the router re-performs, after completing the binding with one device, binding with another device.

After binding with one or at least one device, during router deployment, in addition to determining the advantage and the disadvantage of the deployment of the entire network, the methods in the foregoing embodiments need to be adopted to further determine the advantage and the disadvantage of the deployment of the network formed by the newly deployed router and the device bound to the newly deployed router. If the newly deployed router ensures not only relatively good robustness of the entire network but also relatively good robustness of the network in a specific area, the deployment location is considered relatively good.

Further, the user may be prompted to select different judgment modes. According to a judgment mode selected by the user, the method in one of the foregoing embodiments is adopted to perform judgment.

A user may deploy a router for different purposes, or the purposes may change during router deployment, for example, from a need to make the network coverage range as large as possible at the beginning to a need to enhance the network robustness as far as possible later. In particular, after the network operates normally, indication of the network robustness becomes more meaningful. Therefore, based on all the foregoing embodiments, the router may add configuration of an indication mode. For example, a mode 1 aims to enhance the coverage range and has no high requirement on the robustness, and therefore selection of the first threshold or the second threshold may be relatively loose on a condition that the minimum acceptable connectivity is met; a mode 2 aims to enhance the robustness, and therefore selection of the first threshold or the second threshold may be relatively strict on a condition that higher connectivity is met; a mode 3 aims to enlarge the coverage or enhance the robustness while considering the connection with the bound device, and therefore judgment may be performed according to a network parameter in the bound network.

In terms of the device, the router needs to add a mode selecting module to select the mode to be indicated. For example, the user may select different indication modes by using the button.

In addition, the router has many configuration attributes, for example, various thresholds in the foregoing embodiments, including an RSSI threshold, an LQI threshold, an average packet loss rate threshold, a communication delay threshold, a link cost threshold, and the like. A working mode may be selected by modifying these attributes. For example, use the configuration tool or a write attribute command of ZigBee to perform attribute setting.

Another thing to note is that the router with an indication function in the foregoing embodiments may also perform judgment at any time according to the foregoing parameters and indicate the advantage and the disadvantage of the current deployment location during normal operating, in addition to performing judgment and indication only when the router joins the network. Because a communication environment changes all the time, the advantage and the disadvantage of the deployment location of the router may also change at any time. The user may decide whether to adjust the location of the router as required.

Figure 11:
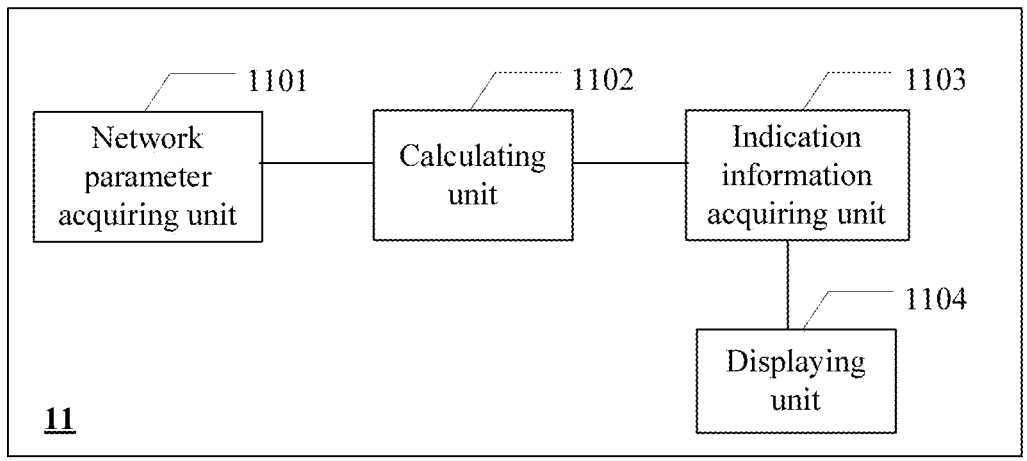
FIG. 11 is a schematic structural diagram of a router in a ZigBee network provided in an embodiment of the present invention.

Referring to FIG. 11, corresponding to the foregoing methods, a router 11 in a ZigBee network according to an embodiment of the present invention includes: a network parameter acquiring unit 1101 configured to acquire a network parameter of at least one network device in a network connecting to the router 11, where the network parameter is used to indicate connection performance of a link between the network devices in the network; a calculating unit 1102 configured to calculate the number of network parameters meeting a predefined threshold condition; an indication information acquiring unit 1103 configured to map the number of the network parameters meeting the predefined threshold condition to corresponding indication information, where the indication information indicates deployment performance of the router in the network; and a displaying unit 1104 configured to provide the indication information for a user, where the indication information is used to instruct the user to set a location for the router in the network.

Corresponding to different network parameters, the calculating unit 1102 has different implementation manners.

In an embodiment, the network parameter is an RSSI of the network device. Therefore, the calculating unit is configured to calculate the number of RSSIs larger than or equal to a set threshold.

In another embodiment, the network parameter is an LQI between any two nodes in the network formed by a neighboring node and a neighboring node of the neighboring node. Therefore, the calculating unit is configured to calculate the number of LQIs larger than or equal to a set threshold.

In another embodiment, the network parameter is a packet loss rate between any two nodes in the network formed by the neighboring node and a neighboring node of the neighboring node. Therefore, the calculating unit is configured to calculate the number of packet loss rates smaller than or equal to a set threshold.

In another embodiment, the network parameter is a communication delay between any two nodes in the network formed by the neighboring node and a neighboring node of the neighboring node. Therefore, the calculating unit is configured to calculate the number of communication delays smaller than or equal to a set threshold.

In another embodiment, the network parameter is a link cost of the neighboring node of the router. Therefore, the calculating unit is configured to calculate the number of link costs smaller than or equal to a cost threshold.

In another embodiment, the network parameter is a link cost of a two-hop neighboring node of the router. Therefore, the calculating unit is configured to calculate the number of link costs smaller than or equal to a cost threshold.

The indication information acquiring unit 1103 is configured to map the number of the network parameters meeting the predefined threshold condition to one of at least two corresponding values, where the at least two values correspond to different levels of the deployment performance. Different implementation manners may be available.

In an embodiment, the indication information acquiring unit includes: a first mapping unit configured to map location deployment indication information of the router to first indication information when the number of the network parameters meeting the predefined threshold condition is larger than or equal to a first threshold; and a second mapping unit configured to map the location deployment indication information to second indication information when the number of the network parameters meeting the predefined threshold condition is smaller than the first threshold, where the first indication information has a higher deployment performance level than the second indication information.

In another embodiment, the indication information acquiring unit includes: a first mapping unit configured to map location deployment indication information of the router to first indication information when the number of the network parameters meeting the predefined threshold condition is larger than or equal to a first threshold and is smaller than or equal to a second threshold; and a second mapping unit configured to map the location deployment indication information of the router to second indication information when the number of the network parameters meeting the predefined threshold condition is smaller than the first threshold or is larger than the second threshold, where the first indication information has a higher deployment performance level than the second indication information.

For example, the first indication information indicates that performance of the router meets a requirement when the router is deployed in the location. The second indication information indicates that the performance of the router does not meet the requirement when the router is deployed in the location.

In another embodiment, the indication information includes N values. The indication information acquiring unit includes: a third mapping unit configured to map the number of the network parameters meeting the predefined threshold condition to one of the corresponding N values, where N is an integer greater than or equal to 3. A larger number of the network parameters meeting the predefined threshold condition indicates a larger value. For example, the number of the network parameters meeting the predefined threshold condition is mapped to an integer value (for example, ranging from 0 to 5). A larger value indicates a better location. For example, a full score (5 score) indicates a best location, a lower score indicates a worse location, and a 0 score indicates that a current location is unavailable.

The displaying unit 1104 has multiple implementation manners. For example, the displaying unit 1104 may be a light-emitting diode, a display screen, a seven-segment digital tube, a sounding apparatus, a beeping apparatus, or a vibration apparatus.

In a manner, the LED may be used for displaying. If the current location is relatively good, the LED is on; otherwise, the LED is off. In another manner, at least one LED may be used. The number of LEDs that are on varies with a status of the location. A better location indicates a larger number of LEDs that are on, and vice versa. In another manner, LED colors may be used to differentiate different indication information. For example, a red color indicates that the location is not good, a yellow color indicates that the location is common, and a green color indicates that the location is relatively good. In another manner, the indication information may be displayed by using the display screen, the seven-segment digital tube, or a digit. For example, a larger digit indicates a better location. In addition to the displaying manner, the indication information may also be provided for the user in an auditory manner. In a manner, indication information may be prompted by using a voice, providing convenience for a visually impaired user. In another manner, the indication information may be intuitively provided by using a sound volume of a beep. For example, a larger sound indicates a better location, and vice versa. In another implementation manner, the indication information may be provided in a tactile manner. The indication information may be intuitively provided according to how strong a vibration is. For example, a stronger device vibration indicates a better location, and vice versa.

Figure 12:
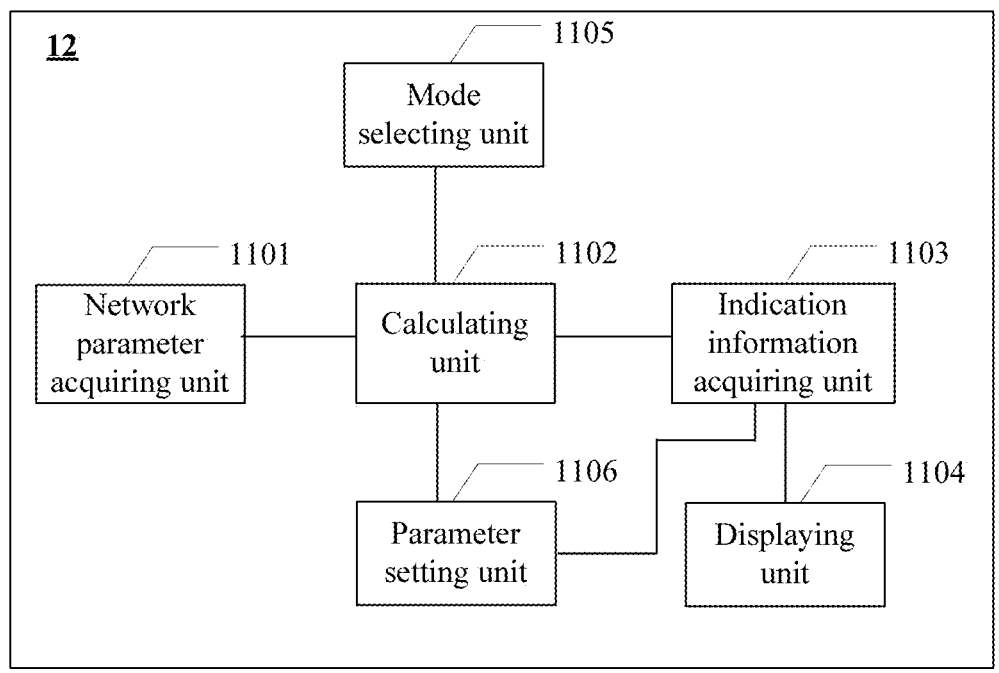
FIG. 12 is a schematic structural diagram of a router in a ZigBee network provided in another embodiment of the present invention.

Referring to FIG. 12, in another embodiment, the router 12 further includes a mode selecting unit 1105 configured to prompt a user to select different modes and calculate the number of network parameters meeting a predefined threshold condition according to a mode selected by the user. For different modes, calculation methods or adopted parameters may be different.

Referring to FIG. 12, in another embodiment, the router 12 further includes a parameter setting unit 1106 configured to set a threshold condition corresponding to the network parameter, a first threshold and a second threshold. For example, the parameter setting unit may determine the first threshold or the second threshold according to the number of devices in a network.

In several embodiments provided in the present application, the foregoing modules can be implemented through electronic hardware or a combination of computer software and the electronic hardware. For example, an electronic circuit is used to implement the foregoing units, or a processor is available to call the foregoing modules to implement the deployment of the router.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, at least one unit or component may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on at least one network unit. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The invention claimed is:

1. A method for setting a network node location, wherein the method is applied in a router in a ZigBee network, the method comprising:
   acquiring, by the router, a network parameter of at least one network device in a network connecting to the router, wherein the network parameter is used to indicate connection performance of a link between the network devices;
   calculating a number of network parameters meeting a predefined threshold condition;
   mapping the number of the network parameters meeting the predefined threshold condition to corresponding indication information, wherein the indication information indicates deployment performance of the router in the network, wherein a first indication information indicates acceptable deployment performance, and wherein a second indication information indicates unacceptable deployment performance; and
   providing the indication information for a user, wherein the indication information is used to instruct the user to set a location for the router in the network, wherein the second indication information indicates unacceptable deployment performance when the number of network parameters meeting the predefined threshold condition indicates that a density of network devices in the ZigBee network is unacceptably high with the router in a current location in the network.

2. The method according to claim 1, wherein mapping the number of the network parameters meeting the predefined threshold condition to the corresponding indication information comprises mapping to one of at least two corresponding values according to the number of the network parameters meeting the predefined threshold condition; and wherein the at least two values correspond to different levels of the deployment performance.

3. The method according to claim 2, wherein mapping to one of the at least two corresponding values according to the number of the network parameters meeting the predefined threshold condition comprises:
   mapping to first indication information based on the determination that the number of the network parameters meeting the predefined threshold condition is larger than or equal to a first threshold; and
   mapping to second indication information based on the determination that the number of the network parameters meeting the predefined threshold condition is smaller than the first threshold, wherein the first indication information has a higher deployment performance level than the second indication information.

4. The method according to claim 2, wherein mapping to one of the at least two corresponding values according to the number of the network parameters meeting the predefined threshold condition comprises:

mapping to first indication information based on the determination that the number of the network parameters meeting the predefined threshold condition is larger than or equal to a first threshold and is smaller than or equal to a second threshold; and mapping to second indication information based on the determination that the number of the network parameters meeting the predefined threshold condition is smaller than the first threshold or is larger than to the second threshold, wherein the first indication information has a higher deployment performance level than the second indication information.

5. The method according to claim 2, wherein mapping to one of the at least two corresponding values according to the number of the network parameters meeting the predefined threshold condition comprises mapping the number of the network parameters meeting the predefined threshold condition to one of N corresponding values, wherein a larger number of the network parameters meeting the predefined threshold condition indicates a larger value, and wherein N is an integer greater than or equal to 3.

6. The method according to claim 5, wherein the first threshold, the second threshold, or both are determined according to a number of devices in the network.

7. The method according to claim 1, wherein at least one of the following conditions is met:

both wherein the network parameter comprises a receive signal strength indicator (RSSI) of the network device, and wherein calculating the number of the network parameters meeting the predefined threshold condition comprises calculating the number of RSSIs larger than or equal to a set threshold;

both wherein the network parameter comprises a link quality index (LQI) between any two nodes in the network formed by the router and a neighboring node, and wherein calculating the number of the network parameters meeting the predefined threshold condition comprises calculating the number of LQIs larger than or equal to a set threshold;

both wherein the network parameter comprises a packet loss rate between any two nodes in the network formed by the router and a neighboring node, and wherein calculating the number of the network parameters meeting the predefined threshold condition comprises calculating the number of packet loss rates smaller than or equal to a set threshold;

both wherein the network parameter comprises a communication delay between any two nodes in the network formed by the router and a neighboring node and wherein calculating the number of the network parameters meeting the predefined threshold condition comprises calculating the number of communication delays smaller than or equal to a set threshold;

both wherein the network parameter comprises a link cost of a neighboring node of the router and wherein calculating the number of the network parameters meeting the predefined threshold condition comprises calculating the number of link costs smaller than or equal to a cost threshold; and both wherein the network parameter comprises a link cost of a two-hop neighboring node of the router, and wherein calculating the number of the network parameters meeting the predefined threshold condition comprises calculating the number of link costs smaller than or equal to a cost threshold.

8. The method according to claim 1, wherein acquiring, by the router, the network parameter of at least one network device in the network connecting to the router comprises at least one of:

acquiring the network parameter of at least one network device in a regional network connecting to the router; and acquiring the network parameter of at least one network device in the network formed by a device bound to the router.

9. The method according to claim 1, wherein the providing the indication information for the user comprises at least one of:

displaying the indication information;

providing the indication information for the user in an auditory manner; and providing the indication information in a tactile manner.

10. A router in a ZigBee network, comprising:

a computer processor configured to:

acquire a network parameter of at least one network device in a network connecting to the router, wherein the network parameter is used to indicate connection performance of a link between the network devices;

calculate a number of network parameters meeting a predefined threshold condition;

map the number of the network parameters meeting the predefined threshold condition to corresponding indication information, wherein the indication information indicates deployment performance of the router in the network, wherein a first indication information indicates acceptable deployment performance, and wherein a second indication information indicates acceptable deployment performance; and provide the indication information for a user via a display, wherein the indication information is used to instruct the user to set a location for the router in the network, wherein the second indication information indicates unacceptable deployment performance when the number of network parameters meeting the predefined threshold condition indicates that a density of network devices in the ZigBee network is unacceptably high with the router in the network.

11. The router according to claim 10, wherein the computer processor is further configured to map the number of the network parameters meeting the predefined threshold condition to one of at least two corresponding values according to the number, and wherein the at least two values correspond to different levels of the deployment performance.

12. The router according to claim 10, wherein the computer processor is further configured to:

map location deployment indication information to first indication information when the number of the network parameters meeting the predefined threshold condition is larger than or equal to a first threshold; and map the location deployment indication information to second indication information when the number of the network parameters meeting the predefined threshold condition is smaller than the first threshold, wherein the first indication information has a higher deployment performance level than the second indication information.

13. The router according to claim 10, wherein the computer processor is further configured to:

map location deployment indication information to first indication information when the number of the network parameters meeting the predefined threshold condition is larger than or equal to the first threshold and is smaller than or equal to the second threshold; and map the location deployment indication information to second indication information when the number of the network parameters meeting the predefined threshold condition is smaller than the first threshold or is larger than the second threshold, wherein the first indication information has a higher deployment performance level than the second indication information.

14. The router according to claim 10, wherein the computer processor is further configured to map the number of the network parameters meeting the predefined threshold condition to one of N corresponding values, and wherein a larger number of the network parameters meeting the predefined threshold condition indicates a larger value, and N is an integer greater than or equal to 3.

15. The router according to claim 10, wherein at least one of the following conditions is met:

both wherein the network parameter comprises a receive signal strength indicator (RSSI) of the network device, and wherein the computer processor is further configured to calculate the number of RSSIs larger than or equal to a set threshold;

both wherein the network parameter comprises a link quality indicator (LQI) between any two nodes in the network formed by the router and a neighboring node, and wherein the computer processor is further configured to calculate the number of LQIs larger than or equal to a set threshold;

both wherein the network parameter comprises a packet loss rate between any two nodes in the network formed by the router and a neighboring node, and wherein the computer processor is further configured to calculate the number of packet loss rates smaller than or equal to a set threshold;

both wherein the network parameter comprises a communication delay between any two nodes in the network formed by the router and a neighboring node, and wherein the computer processor is further configured to calculate the number of communication delays smaller than or equal to a set threshold;

both wherein the network parameter comprises a link cost of a neighboring node of the router, and wherein the computer processor is further configured to calculate the number of link costs smaller than or equal to a cost threshold; and both wherein the network parameter comprises a link cost of a two-hop neighboring node of the router, and wherein the computer processor is further configured to calculate the number of link costs smaller than or equal to a cost threshold.

16. The router according to claim 10, wherein the display is at least one of a light-emitting diode, a display screen, a seven-segment digital tube, a sounding apparatus, a beeping apparatus, and a vibration apparatus.

17. The router according to claim 10, wherein the computer processor is further configured to prompt the user to select different modes and calculate the number of the network parameters meeting the predefined threshold condition according to a mode selected by the user.

18. The router according to claim 10, wherein the computer processor is further configured to set a threshold condition corresponding to the network parameter.

19. The method according to claim 1, wherein the method is performed without receiving input from the user.

20. The method according to claim 19, wherein the first indication information indicating acceptable deployment performance and the second indication information indicating unacceptable deployment performance enables setting the network node location without requiring networking knowledge of the user.

* * * * *